T. W. GRINTER.
Manufacture of Satchel-Bottomed Paper-Bags.
No. 155,611. Patented Oct. 6, 1874.
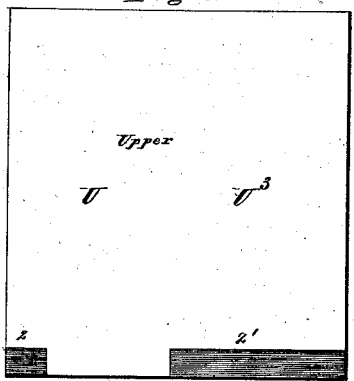
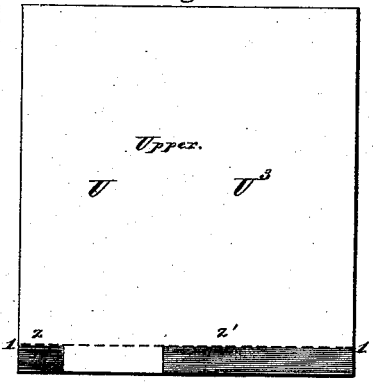
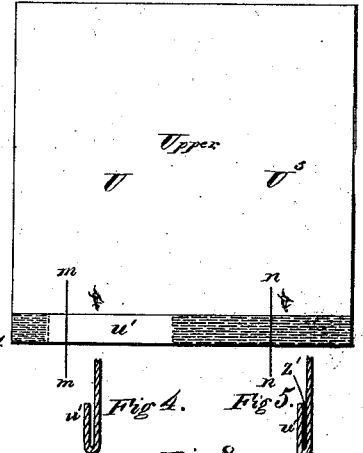
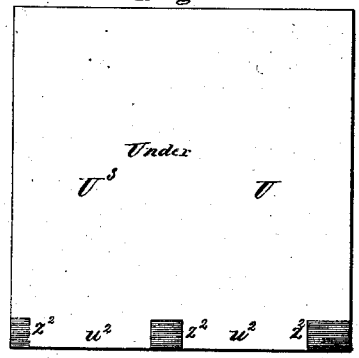
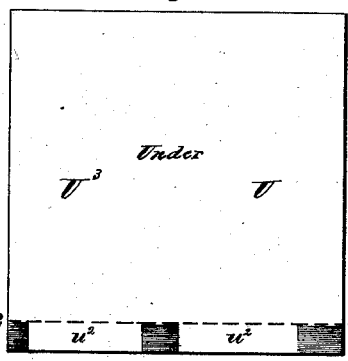
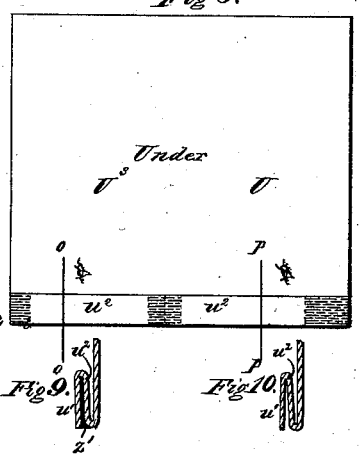
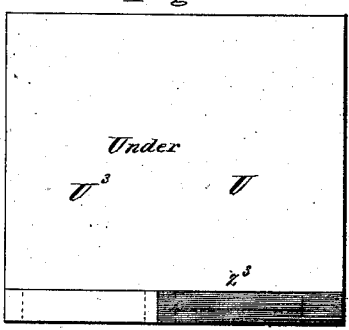
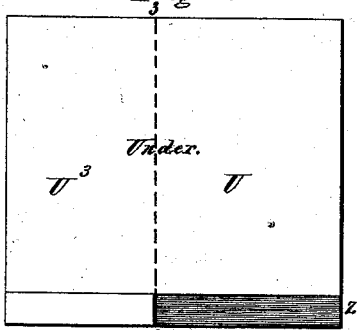
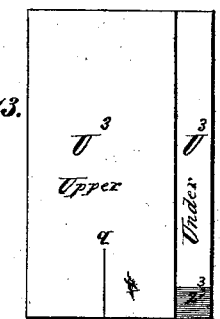
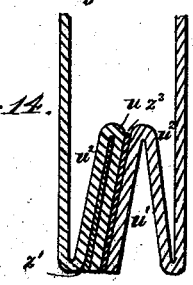

2 Sheets--Sheet 2.

T. W. GRINTER.
Manufacture of Satchel-Bottomed Paper-Bags.

No. 155,611. Patented Oct. 6, 1874.

Witnesses.
Harry King.
Jos. S. Peyton.

Inventor.
Thomas W. Grinter
by his Atty
W. D. Baldwin

UNITED STATES PATENT OFFICE.

THOMAS W. GRINTER, OF CINCINNATI, OHIO, ASSIGNOR TO HIMSELF AND JOSEPH F. JEWETT, OF SAME PLACE.

IMPROVEMENT IN THE MANUFACTURE OF SATCHEL-BOTTOMED PAPER BAGS.

Specification forming part of Letters Patent No. 155,611, dated October 6, 1874; application filed February 23, 1874.

CASE C.

*To all whom it may concern:*

Be it known that I, THOMAS W. GRINTER, of Cincinnati, in the county of Hamilton and State of Ohio, have invented a new and useful Improvement in the Manufacture of Satchel-Bottomed Paper Bags, of which the following is a specification:

So far as my knowledge extends satchel-bottomed bags are universally made in one of two ways: first, by cutting the bags from a previously-formed paper tube, and then folding the bottom; or, secondly, by forming the bag from a blank previously cut of the requisite size. In the latter class the side folds of the bag are first formed and then the bottom.

My invention relates to that class of satchel-bottomed bags having a side and bottom seam, which class I prefer to those having a central seam, as this latter construction impedes the printing upon the bag of advertisements, &c.

The object of this invention is to form such bags from a rectangular blank cheaply, expeditiously, and without waste; to which end my improvement consists in a novel method of manufacturing satchel-bottomed paper bags by first forming a bellows fold on one end of the blank, and then forming the side flaps, the manner of doing which is hereinafter more fully specified.

My improved bags may be made either by hand or by machinery. In another application for Letters Patent filed simultaneously herewith I have shown, described, and claimed mechanism appropriate to the formation of such bags. Such mechanism, however, forms no part of the subject-matter herein claimed, which subject-matter is hereinafter specified.

The accompanying drawings represent the various stages of manufacture of my improved bag. The continuous dark lines of shading show where the paste is applied on the side next the spectator. The broken shading represents the paste as seen through the paper— that is, as applied on the side opposite the spectator. The single continuous lines show the edges of the folds, and the single broken lines indicate the creases.

Figure 15:
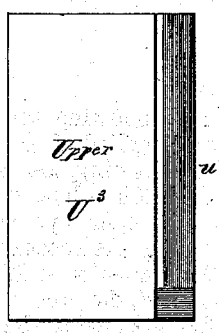
Figure 16:
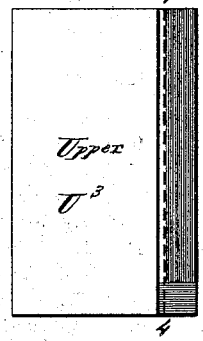
Figure 17:
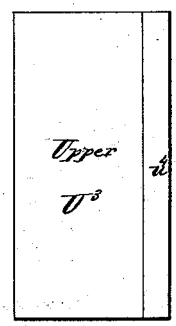
Figure 18:
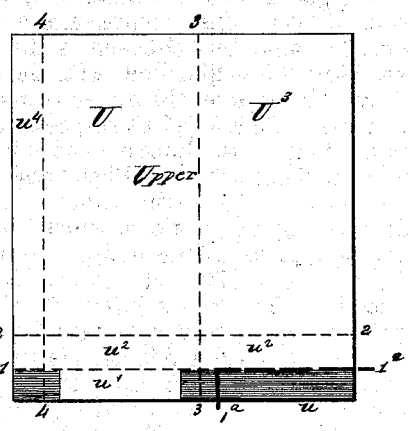
Figure 19:
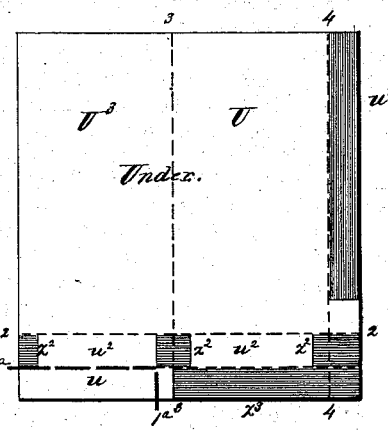
Figure 20:
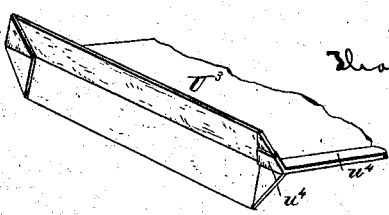

Figure 1 represents the upper side of the blank, (which ultimately forms the outer side of the completed bag,) showing the points at which the paste is first applied. Fig. 2 is a similar view of the same, showing the first crease and the pasting. Fig. 3 is a like view, showing the first fold turned back upon the upper surface of the blank. Fig. 4 is a section through this first fold on the line $m$ $m$ of Fig. 3; and Fig. 5, a similar one on the line $n$ $n$ of said figure, the eye in Fig. 3 showing the direction in which the spectator is supposed to be looking. Fig. 6 represents the under side of the blank (which ultimately forms the inner side of the bag) after the first fold is turned back on the upper or opposite side, as in Fig. 3, and shows the points at which paste is applied on the second fold. Fig. 7 represents a similar view of the same, but also shows the second crease. Fig. 8 is a like view, with the second fold turned back upon the under or inner side of the blank. Figs. 9 and 10, respectively, represent sections on the lines $o$ $o$ and $p$ $p$ of Fig. 8, similar to those shown in Figs. 4 and 5. Fig. 11 represents a view of the under side of the blank, showing the mode in which the third pasting is applied to the under or inner side of the first fold after the second fold has been made. Fig. 12 is a like view, showing the third crease, (the first longitudinal one.) Fig. 13 shows the main flap as it is formed by the third crease. Fig. 14 represents a section therethrough on the line $q$ $q$ of Fig. 13, showing the folds of the satchel-bottom. Fig. 15 shows the manner in which the edge flap is pasted. Fig. 16 shows the final crease, and Fig. 17 represents the completed bag. Fig. 18 is a diagram of the upper or outer side of the blank, showing the lines of the creases and the pasting. Fig. 19 is a similar view of the under side of the blank. Fig. 20 is a view showing the manner in which the bottom corners of the bag may be turned in, if desired.

In manufacturing my improved bags I, by preference, take a rectangular blank of the entire length of the bag, (including the bottom folds,) and of a width equal to that of all the flaps, and apply paste thereto on the parts marked $z^1$ $z^1$, Figs. 1 and 2. I then form a fold, $w^1$, Fig. 3, by folding back the end of the blank upon its upper surface on the line 1 1 of Fig.

2. The paste causes the fold to adhere to the blank. The form of this fold is shown in section in Figs. 4 and 5. Paste is now applied on the under side of the blank, or that opposite the first fold, at the points $z^2$, Figs. 6 and 7, and the second bottom fold, $u^2$, is formed by turning this pasted portion back upon the inner side of the blank, as in Fig. 8, on the line 2 2 of Fig. 7. The first fold is of course turned back with the second. (See Figs. 9 and 10.) The part $z^3$, Figs. 11 and 12, of this fold is now pasted and the flap $u^3$ creased on the line 3 3 and turned over upon the central part U of the blank. (See Figs. 12 and 13.) The side flap $u^4$ is now pasted and turned over on the line 4 4, (see Figs. 15, 16, and 17,) thus completing the bag.

Fig. 14 shows a section through the completed bag. It will be seen by this figure that a portion, $u$, of the first fold is pasted on both sides, and is, in heavy bags, superfluous. It may, therefore, be cut out of the blank before pasting, if desired, being that portion included by the heavy broken lines $1^a$ in Figs. 18 and 19.

The bottom corners of the bag may also, if desired, be turned or folded inwardly, as shown in Fig. 20, being first pasted on the inside to cause the turned-in parts to adhere to the bottom folds.

I claim—

1. The improvement herein set forth in the art of manufacturing satchel-bottomed paper bags, which consists in first pasting and folding a rectangular blank upon itself at one end, which folds, when again pasted, are united to one another to form the bottom, when the blank is folded longitudinally upon itself to form the sides, which sides are united by a single pasted seam to complete the bag.

2. The satchel-bottomed paper bag herein described, having a side and bottom seam and a bellows-fold bottom, as set forth.

In testimony whereof I have hereunto subscribed my name.

THOMAS W. GRINTER.

Witnesses:
  GEO. E. JEWETT,
  JAMES M. KELLEY.